United States Patent
Takaoka et al.

(10) Patent No.: US 6,844,562 B2
(45) Date of Patent: Jan. 18, 2005

(54) DISTANCE MEASURING SENSOR AND METHOD FOR MANUFACTURING THE SAME

(75) Inventors: Takashi Takaoka, Nara (JP); Shinya Kawanishi, Tenri (JP)

(73) Assignee: Sharp Kabuskiki Kaisha, Osaka (JP)

( * ) Notice: Subject to any disclaimer, the term of this patent is extended or adjusted under 35 U.S.C. 154(b) by 155 days.

(21) Appl. No.: 10/359,622

(22) Filed: Feb. 7, 2003

(65) Prior Publication Data

US 2003/0184725 A1 Oct. 2, 2003

(30) Foreign Application Priority Data

Mar. 27, 2002 (JP) .......................................... 2002-088606

(51) Int. Cl.[7] .............................. G02B 7/04; G01C 3/08
(52) U.S. Cl. .............................. 250/559.38; 250/201.6; 356/3.01; 356/3.05; 396/111
(58) Field of Search ....................... 250/559.38, 559.31, 250/559.3, 201.6, 201.4, 221, 222.1; 356/3.01, 3.04–3.06, 4.01, 623; 396/111, 119, 120, 121

(56) References Cited

U.S. PATENT DOCUMENTS 4,983,033 A * 1/1991 Suzuki ...................... 356/3.01
5,082,363 A * 1/1992 Nakanishi et al. ......... 356/3.04

FOREIGN PATENT DOCUMENTS

JP     4-256807 A    9/1992
JP     10-267647 A   10/1998

* cited by examiner

Primary Examiner—Kevin Pyo
(74) Attorney, Agent, or Firm—Birch, Stewart, Kolasch & Birch, LLP.

(57) ABSTRACT

A distance measuring sensor includes a case subassembly having inside a light emitting element and a light receiving element, and a lens case subassembly having a projection lens projecting a light output from the light emitting element and a condenser lens condensing the light reflected from the object, and attached to a front side of the case subassembly. The condenser lens is movably attached to the lens case subassembly, and after an output is adjusted, this condenser lens is fixed thereto. Thus, the distance measuring sensor enabling easier adjustment of an output can be provided.

11 Claims, 10 Drawing Sheets

DISTANCE MEASURING SENSOR AND METHOD FOR MANUFACTURING THE SAME

This nonprovisional application claims priority under 35 U.S.C. §119(a) on patent application Ser. No. 2002-088606 filed in JAPAN on Mar. 27, 2002, which is herein incorporated by reference.

BACKGROUND OF THE INVENTION

1. Field of the Invention

The present invention relates to a distance measuring sensor detecting a position and a tilt of an object, a distance to the object and the like, by projecting a light on the object and receiving the light reflected therefrom, and a method for manufacturing such a distance measuring sensor.

2. Description of the Background Art

Figure 11:
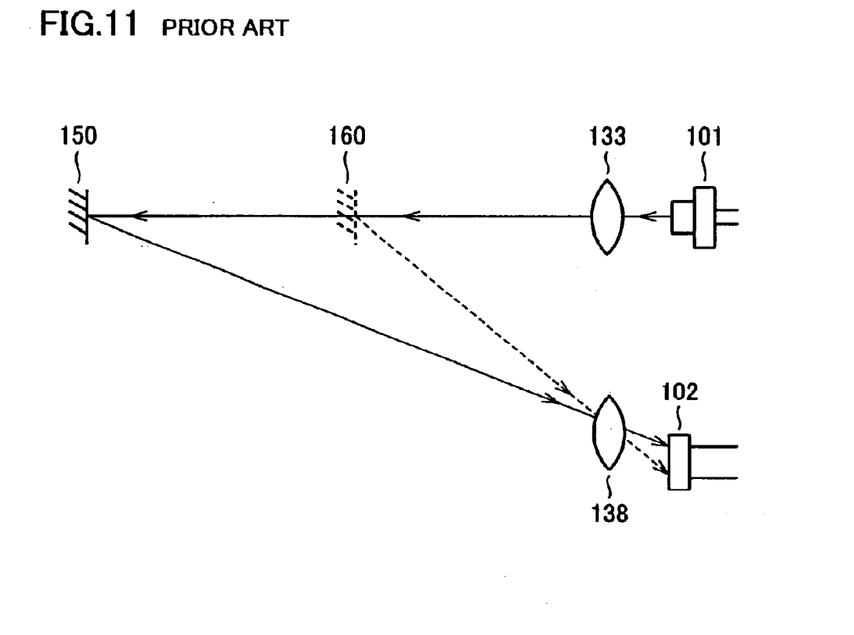
FIG. 11 is a schematic view of the distance measuring sensor applying a so-called triangle measuring method, related to a description of principle of distance measurement thereof.

As a device for measuring a distance to an object, a distance measuring sensor applying a so-called triangle measuring method is known. FIG. 11 is a schematic view of the distance measuring sensor applying a so-called triangle measuring method, which should be referred in a following description of the principle of distance measurement thereof. A pulsed light output from a light emitting element, i.e., a light emitting diode (LED) 101, becomes a narrow beam through a projection lens 133, and projected on an object 150 or 160. The light reflected from object 150 or 160 is condensed on a light receiving face of a light receiving element, i.e., a semiconductor position sensitive detector (PSD), by a condenser lens 138.

Here, as shown in FIG. 11, a condensing position (spot position) where reflecting light is condensed by condenser lens 138 may vary in accordance with the distance from the distance measuring sensor to the object. By arranging the light receiving face of PSD 102 so as to cover the variation range of the condensing position, and processing a pair of photocurrent outputs from PSD 102, the distance to the object can be measured. It should be noted that a divided type photodiode having a plurality of light receiving faces may be used as a light receiving device other than the PSD.

Figure 12:
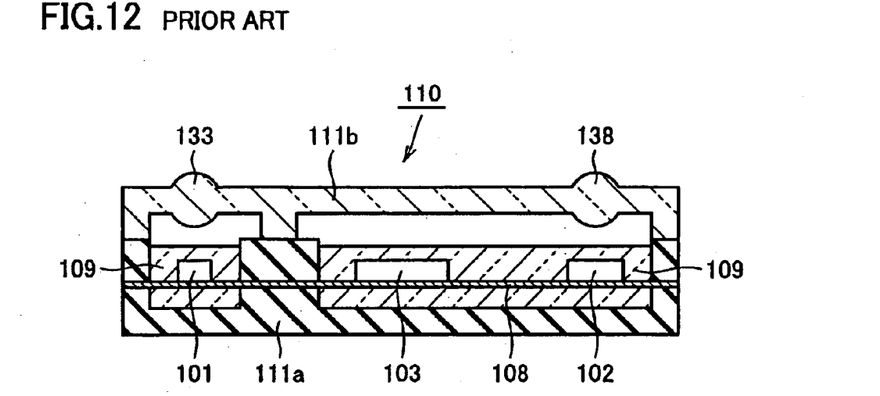
FIG. 12 is a cross-sectional view showing a structure of a conventional distance measuring sensor.

FIG. 12 is a cross-sectional view showing a structure of a conventional distance measuring sensor using above-mentioned triangle measuring method. In conventional distant measuring sensor 110, LED 101, PSD 102, and a control IC 103 are mounted by die bonding, wire bonding or the like, on a lead frame 108. A translucent resin 109 is molded over these elements. Further, a case 111a consisting of an opaque resin is molded over translucent resin 109. Here, optical windows for passing lights are provided at least to the upper face of case 111a facing to LED 101 and PSD 102. A lens case 111b in which projection lens 133 and condenser lens 138 are integrally molded with the translucent resin is attached on case 111a.

Figure 13:
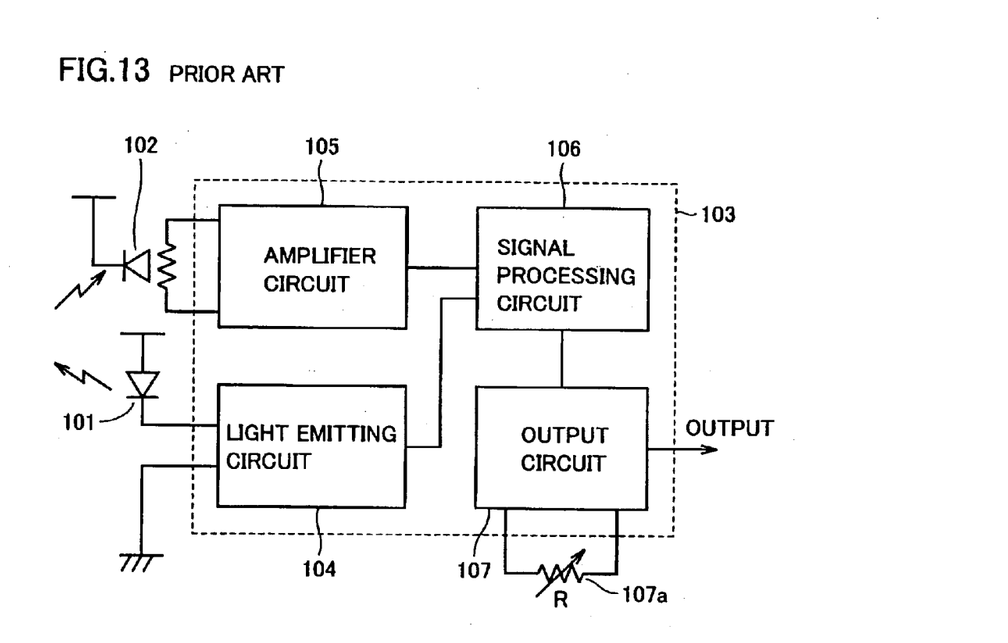
FIG. 13 is a circuit diagram of the conventional distance measuring sensor.

FIG. 13 is a circuit diagram of the conventional distance measuring sensor. A clock pulse having a prescribed period from an oscillator circuit arranged in a signal processing circuit 106 is provided to a timing generator circuit similarly arranged in signal processing circuit 106, and thus a drive pulse is generated. The drive pulse is input to light emitting circuit 104, and then LED 101 emits light.

A pair of feeble photocurrent outputs obtained by PSD 102 sensing the reflecting light is amplified by an amplifier circuit 105 and input to signal processing circuit 106. An operation processing based on this input signal is performed in signal processing circuit 106, and the result thereof is output to the outside via an output circuit 107. Normally, light emitting circuit 104, amplifier circuit 105, signal processing circuit 106, and output circuit 107 are integrally packaged in one control IC 103.

Figure 14:
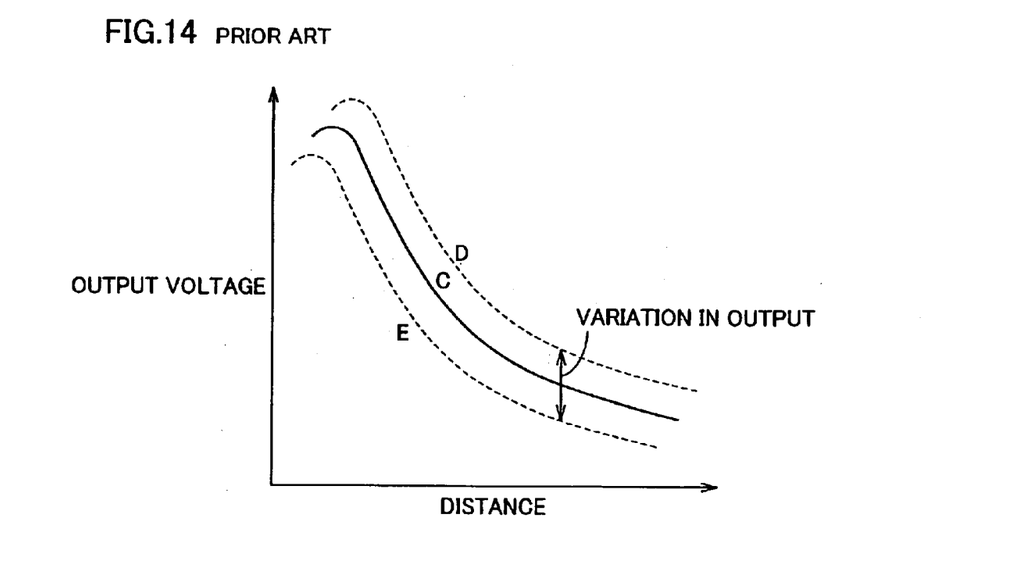
FIG. 14 shows variation in element characteristics of PSD.

As for signal processing schemes, there are an analog output scheme in which an output value fluctuating in accordance with the distance, as shown in FIG. 14, is provided as information of a distance to an object, and an H/L output scheme in which an output value and a preset threshold value are compared and the result is output as a high (H) or a low (L) pulse.

On the other hand, in either output scheme, errors exist between the actual distance to an object and the output value of the distance measuring sensor. The errors may occur due to (1) variation in attaching position precision of LED, the projection lens, the condenser lens, and PSD, and (2) variation in element characteristics such as light emitting characteristics of LED, and light receiving characteristics of PSD.

For example, in the analog output scheme, such variations result in an output characteristics curve D or E shown by dotted lines in FIG. 14 that varies relative to a reference output characteristics curve C shown by solid line. Thus, errors occur between the actual distance to an object and the output value of the distance measuring sensor due to the above-mentioned variation in attaching position precision and variation in element characteristics. It applies to the H/L output scheme as well.

As a method for reducing the errors in output, one possible method is to measure the distance, after completing assembly of a distance measuring sensor, to an actually installed object with the distance measuring sensor and adjusting the obtained output value to a correct value.

For example, as shown in FIG. 13, one of the possible method is to arrange an external variable resistor 107a connected to output circuit 107 beforehand, and adjust the resistance value R of external variable resistor 107a to electrically adjust the output value for reducing the errors. On the other hand, the external circuit is required separately when using this method, which increases the manufacturing costs.

Another possible method is to correct the output of the distance measuring sensor with a microcomputer and the like by a user, without any adjustment in the manufacturing process of the distance measuring sensor. This method, however, will be a burden to a user, and therefore not preferable.

SUMMARY OF THE INVENTION

The object of the present invention is to provide a distance measuring sensor enabling easier adjustment of its output, and a method for manufacturing the same.

A distance measuring sensor according to the present invention includes a light emitting element; a projection lens projecting to an object a light output from the light emitting element; a condenser lens condensing the light reflected from the object; and a light receiving element arranged at a position to which the light is condensed by the condenser lens, and receiving the light at a light receiving face to transmit an output signal that varies in accordance with a position of the object. The condenser lens is attached to a support member having a guide mechanism that enables the condenser lens to move in a prescribed direction, and the condenser lens is immovably fixed to the guide mechanism.

Thus, by this mechanical scheme enabling the alignment of condenser lens by movably attaching the condenser lens to the support member, the output of the distance measuring sensor can be adjusted very easily. A scheme in which alight receiving element is aligned requires a highly complicated device arrangement and alignment tasks, from a viewpoint of electrical connections of the light receiving element. In the present configuration, however, by enabling movement of the condenser lens, not only adjustment of the output of the distance measuring sensor is easily achieved, but also manufacturing of the distance measuring sensor is enabled, in compact size and at low costs with a smaller number of parts than the light receiving element aligning scheme. Note that, after completing the alignment, the condenser lens needs to be immovably fixed to avoid displacement under the effect of vibration or the like.

Desirably, in the distance measuring sensor according to the present invention, a moving direction of the condenser lens includes at least a direction parallel to a straight line connecting the light emitting element and the light receiving element. The output of the distance measuring sensor can be adjusted if the condenser lens is movable at least in the above-mentioned direction. If the condenser lens is attached to a support member enabling the movement in one direction, then designing and manufacturing of the distance measuring sensor is easy and its implementation will be facilitated.

Desirably, in the distance measuring sensor according to the present invention, the condenser lens is aligned and fixed to the support member so as to obtain a correct output signal corresponding to a position of the object. Thus, by fixing the condenser lens in order to avoid displacement after completing alignment, which has been movably attached to the support member, the distance measuring sensor may be provided that outputs signals stably and accurately for a long period.

Desirably, in the distance measuring sensor according to the present invention, for example, the condenser lens is fixed to the support member by a light curing adhesive or an instant adhesive. By employing the light curing adhesive or the instant adhesive for fixing the condenser lens to the support member, displacement at the time of fixing them can be avoided. When a heat curing adhesive is used, for example, redundant external force is applied by the thermal expansion of the condenser lens or the support member, which results in the displacement of the condenser lens. In contrast thereto, no external force is generated if the light curing adhesive or the instant adhesive is used, thus the displacement of the condenser lens does not occur.

Desirably, in the distance measuring sensor according to the present invention, for example, an engaging channel extending in the moving direction is provided to one of the condenser lens and the support member, and an engaging rib engaging with the engaging channel is provided to the other one. Thus, by providing the guide mechanism consisting of the engaging channel and engaging rib to the condenser lens and the support member, the moving direction of the condenser lens can easily be determined. As a result, the output of the distance measuring sensor can easily adjusted.

Desirably, the distance measuring sensor according to the present invention further includes, for example, an output adjusting terminal outputting an output signal from the light receiving element to the outside when the condenser lens is at any one position in the moving direction. Thus, by providing the output adjusting terminal enabling monitoring of the output of the light receiving element at its position when aligning the condenser lens, the adjustment of the output can be performed easily. The output adjusting terminal is desirably distinguished from an original output terminal of the distance measuring sensor and configured to output a signal, which is a simply amplified photocurrent signal.

Desirably, the distance measuring sensor according to the present invention further includes, for example, a first subassembly structured by the light emitting element and the light receiving element mounted on a same substrate attached to a case; and a second subassembly attached to a front side of the first subassembly and including the projection lens, the condenser lens and the support member. Thus, by configuring the assembly by separate subassemblies, the first subassembly to which the elements are attached can rather be used generally. Specifically, according to the present configuration, only the second subassembly should be modified in accordance with a specification while the first subassembly is commonly used, thus the distance measuring sensor addressing various specifications can be provided at low costs.

Desirably, in the distance measuring sensor according to the present invention, for example, a shield plate consisting of a conductive material is interposed between the first subassembly and the second subassembly; and the distance measuring sensor may be attached to an electronic device at any angle by changing a protruding direction of a shield terminal of the shield plate relative to the case. Thus, by changing a protruding direction of the terminal of the shield plate interposed between the first subassembly and the second subassembly to various direction, the light projecting direction relative to the substrate of the electronic device to which the distance measuring sensor is attached may be set freely.

A method for manufacturing a distance measuring sensor according to the present invention, in which the distance measuring sensor includes a light emitting element; a projection lens projecting to an object a light output from the light emitting element; a condenser lens movably attached to a support member and condensing the light reflected from the object; and a light receiving element arranged at a position to which the light is condensed by the condenser lens, and receiving the light at a light receiving face to transmit an output signal that varies in accordance with a position of the object; includes a step of aligning and fixing the condenser lens so as to obtain a correct output signal corresponding to a position of the object.

Thus, by including the step of aligning the condenser lens movably attached, the output adjustment can be achieved in a very simple manner.

Desirably, in the method for manufacturing the distance measuring sensor according to the present invention, for example, the alignment of the condenser lens is performed while monitoring an output signal for adjustment provided from the light receiving element. Thus, by monitoring the output signal for alignment concurrently with aligning the condenser lens, the alignment of the condenser lens can be achieved more easily.

Desirably, the method for manufacturing the distance measuring sensor according to the present invention further includes, for example, a step of fixing the condenser lens to the support member with a light curing adhesive or an instant adhesive. Thus, by fixing the condenser lens by the light curing adhesive or the instant adhesive, the displacement of the condenser lens may be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The inventor considered to implement a distance measuring sensor that enables mechanical adjustment of an output. First, referring to FIGS. 15 and 16, distance measuring sensors related to the present invention will be described.

Figure 15:
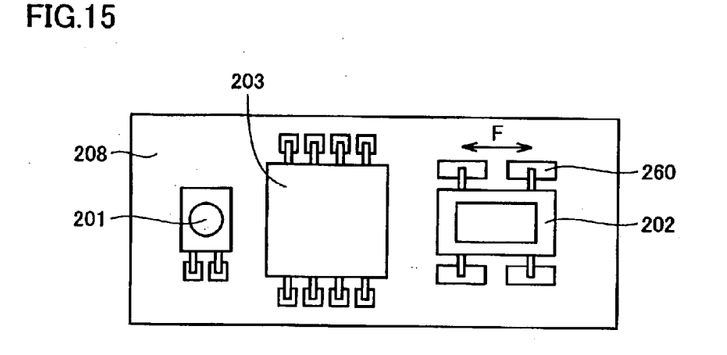
FIG. 15 is a top view of a lead frame showing a structure of a distance measuring sensor studied by the inventor.

In a distance measuring sensor shown in FIG. 15, an attaching position of PSD 202 to be attached on lead frame 208 is adjustably configured. Specifically, an electrode 260 on lead frame 208 to which a terminal of PSD 202 is connected is formed larger than electrodes to which terminals of LED 201 and control IC 203 are connected. Thus, it will be possible to adjust the attaching position of PSD 202 to lead frame 208 in the direction indicated by an arrow F, while monitoring the output of the distance measuring sensor. This alignment achieves the adjustment of the output. According to this scheme, however, the very difficult task is required, that the user must determine the attaching position of PSD 202 while monitoring the output of the distance measuring sensor, and thus it is not preferable.

Figure 16:
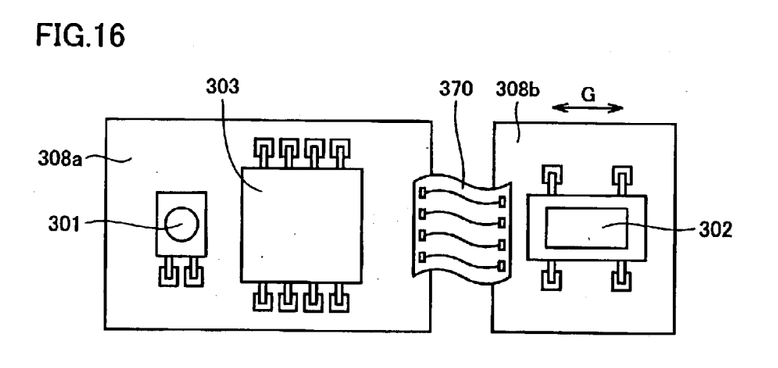
FIG. 16 is a top view of a lead frame showing a structure of another distance measuring sensor studied by the inventor.

In a distance measuring sensor shown in FIG. 16, a lead frame is divided into lead frames 308a and 308b, and LED 301 and PSD 302 are mounted thereto, respectively. Specifically, the adjustment of the output is performed after the mounting, by aligning lead frame 308b in the direction indicated by an arrow G in the figure, while monitoring the output. According to this scheme, however, a flexible wiring 307 and the like for allocating to an electrical connection of divided lead frames 308a, 308b, which increases the manufacturing costs. Additionally, it undesirably increases the size of the device.

The present inventor has finalized the present invention after studying for avoiding such problems associated with above-mentioned schemes. In the following, referring to the figures, embodiments of the present invention will be described.

First Embodiment

Figure 1:
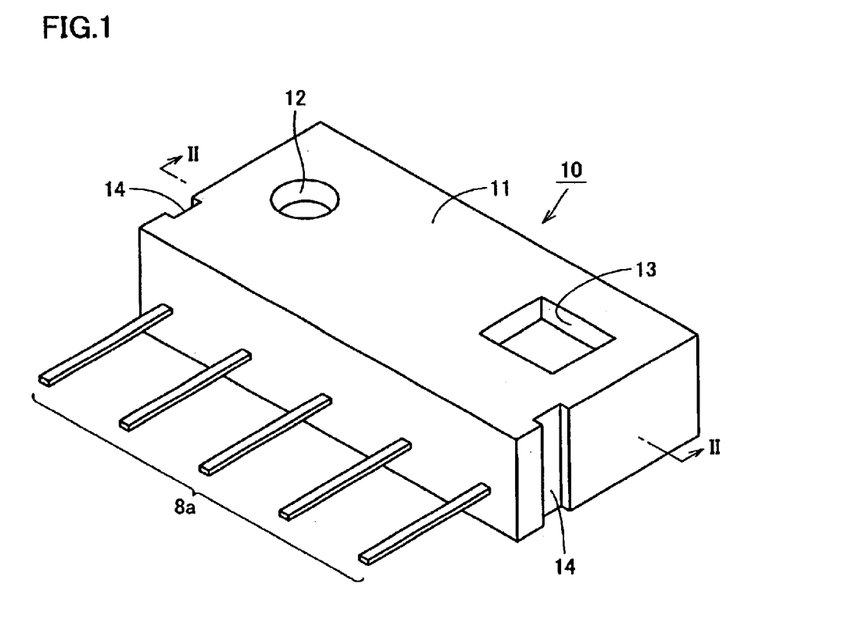
FIG. 1 is a perspective view of a case subassembly configuring a distance measuring sensor according to a first embodiment of the present invention.
Figure 2:
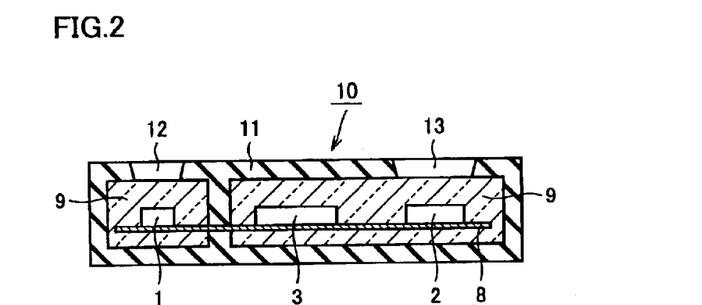
FIG. 2 is a cross-sectional view of the case subassembly configuring the distance measuring sensor according to the first embodiment of the present invention, along a line II—II in FIG. 1.

First, referring to FIGS. 1 and 2, a structure of a case subassembly 10 configuring a distance measuring sensor according to a first embodiment of the present invention will be described. Case subassembly 10 of a first subassembly includes therein a lead frame 8 to which an LED 1, a PSD 2, and a control IC 3 are mounted. A translucent resin 9 is molded over LED 1, PSD 2 and control IC 3. Further, a case 11 consisting of an opaque resin is molded over translucent resin 9. Note that optical windows 12 and 13 for passing lights are provided at the upper portion of case 11 corresponding to LED 1 and PSD 2, respectively. A terminal 8a used as an electrical lead to the outside protrudes from a prescribed position of case 11. Terminal 8a extends from lead frame 8 to the outside of case 11. Case 11 is also provided at its lateral face with a slit 14 to which a shield terminal 24 of a shield, which will be described later, is fitted (see FIG. 3).

Figure 3:
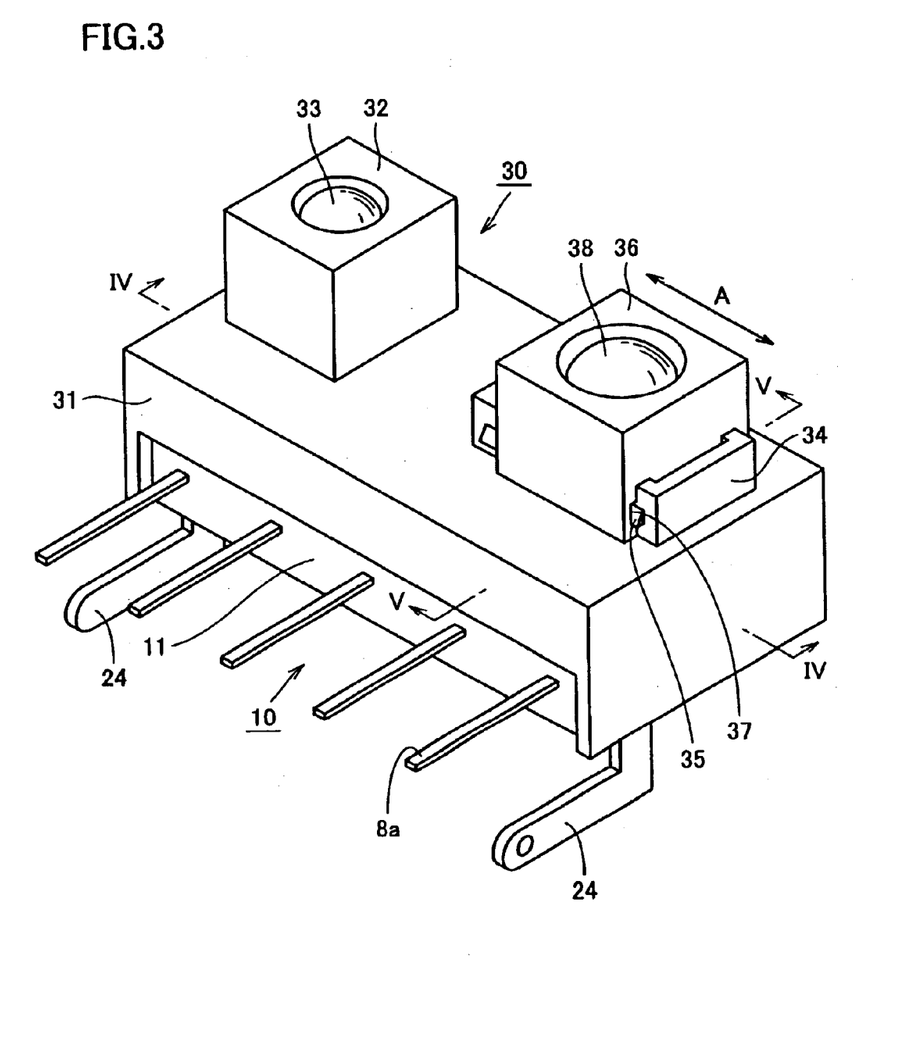
FIG. 3 is a perspective view of the distance measuring sensor according to the first embodiment of the present invention.
Figure 4:
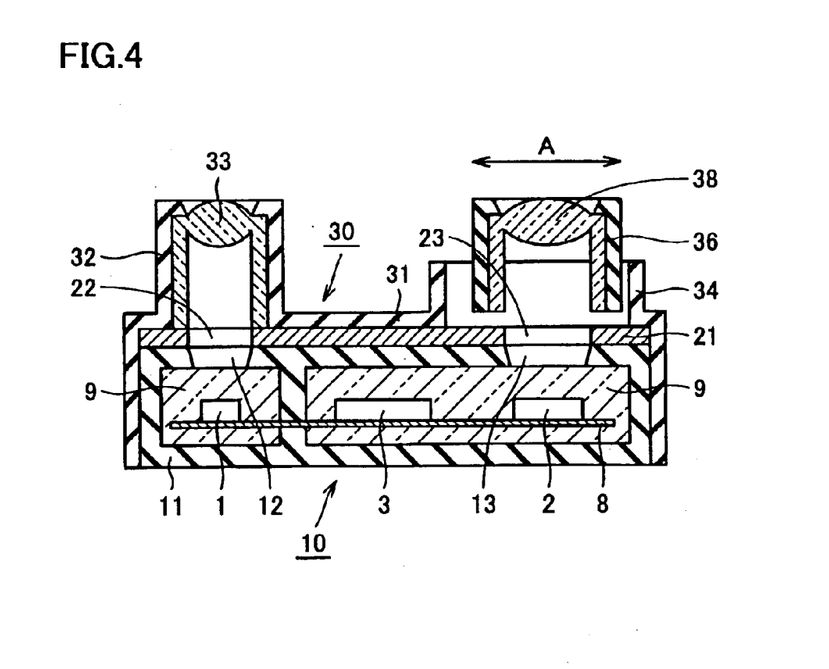
FIG. 4 is a cross-sectional view of the distance measuring sensor according to the first embodiment of the present invention, along a line IV—IV in FIG. 3.
Figure 5:
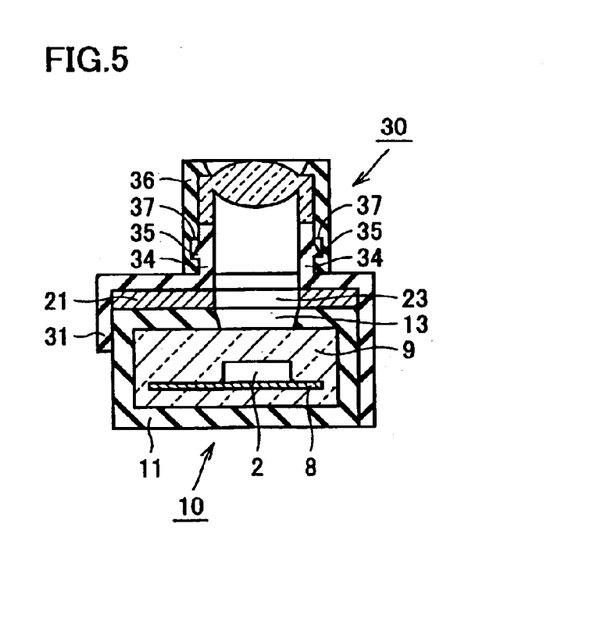
FIG. 5 is a cross-sectional view of the distance measuring sensor according to the first embodiment of the present invention, along a line V—V in FIG. 3.

Next, referring to FIGS. 3 to 5, the structure of the distance measuring sensor according to the present embodiment will be described. The distance measuring sensor of the present embodiment is configured by mounting a lens case subassembly 30 of a second subassembly to the above-mentioned case subassembly 10 of the first subassembly. Further, preferably a shield is interposed between case subassembly 10 and lens case subassembly 30. Optical windows 22 and 23 for passing lights are provided at prescribed positions of a shield face 21 of the shield.

Here, lens case subassembly 30 has a cap forming portion 31, which is a support member designed to cover the top face of the above-mentioned case subassembly 10, and a protrusion 32, to which projection lens 33 is attached. Further, at a prescribed position on the top face of cap forming portion 31, a guiding frame 34 engaging with a movable member 36 equipped with a condenser lens 38 is provided.

At a prescribed position of guiding frame 34, a guiding rail 35 of an engaging rib is formed. Guiding rail 35 extends in the same direction as the moving direction of condenser lens 38 (indicated by an arrow A in the figure). More specifically, it extends parallel to the light receiving face of PSD 2 and also parallel to a straight line connecting LED 1 and PSD 2. To a prescribed position of movable member 36 equipped with condenser lens 38, a guiding channel 37 of an engagement channel is formed, which engages with guiding rail 35 provided at above-mentioned guiding frame 34. With such a configuration, by pushing movable member 36 equipped with condenser lens 38 against guiding frame 34 of cap forming portion 31, condenser lens 38 can easily be attached movably to cap forming portion 31 of the support member.

Figure 6:
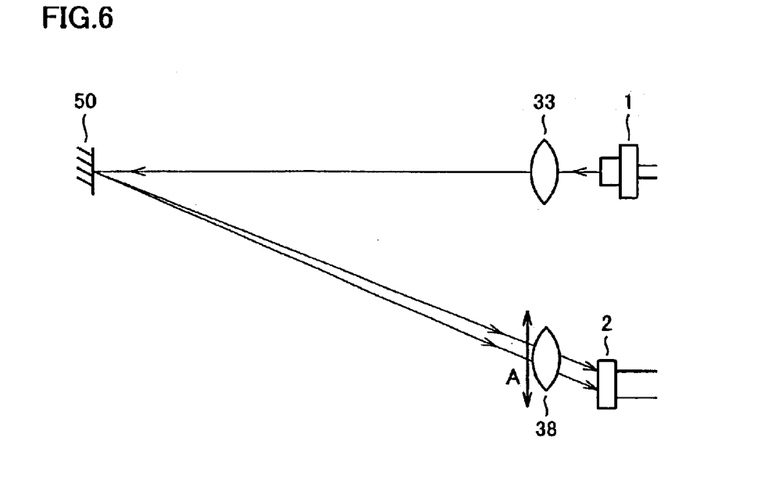
FIG. 6 is a schematic view of the distance measuring sensor of the present invention, related to a description of principle of alignment thereof.

With the configuration above, the distance measuring sensor to which condenser lens 38 is movably attached is implemented. In this distance measuring sensor, as shown in FIG. 6, since condenser lens 38 is movable in the direction indicated by an arrow A in the figure, the adjustment of its output can easily be performed. Specifically, by moving condenser lens 38, the light that has been projected onto an object from LED 1 via projection lens 33 and reflected therefrom can be condensed at any position on the receiving face of PSD 2. Therefore, by moving the condenser lens to a position where a correct output is obtained, the output can easily be adjusted.

In manufacturing the present distance measuring sensor, it is preferable to fix movable member 36 and cap forming portion 31 with a light curing adhesive or an instant adhesive, after the above-mentioned alignment of condenser lens 38. This is to avoid the displacement of condenser lens 38 after the alignment. As a light curing adhesive, a UV adhesive or a visible light curing adhesive may be used, for example. By using a light curing adhesive or an instant adhesive, condenser lens 38 can be fixed to an appropriate position without displacement resulting from redundant external force.

Further, in this configuration, the distance measuring sensor is configured by separate case subassembly 10 and lens case subassembly 30. By dividing the assembly into two parts, it becomes possible to utilize case subassembly 10 for general purpose. Specifically, when manufacturing distance measuring sensors with different specification in measuring range, case subassembly 10 can commonly be used, while only lens case subassembly may be modified addressing to the respective specifications, and thus the manufacturing costs can be reduced.

Figure 7:
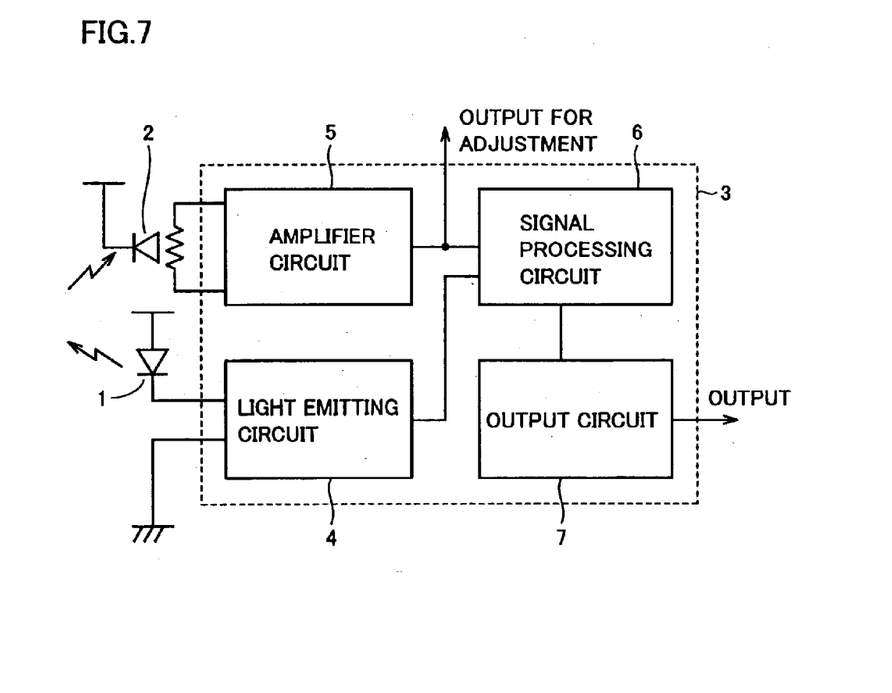
FIG. 7 is a circuit diagram of a position detection circuit of the distance measuring sensor according to the first embodiment of the present invention.

It should be noted that, as shown in FIG. 7, the circuit configuration of the distance measuring sensor according to the present embodiment is different in part from that of a conventional sensor. Specifically, an external variable resistor which is conventionally provided to output circuit 7 is eliminated. Additionally, between amplifier circuit 5 and signal processing circuit 6, a terminal for the output adjustment which enables to extract an output for adjustment independently. Thus, by monitoring the output of the light receiving element from the output adjustment terminal during output adjustment of the distance measuring sensor, it will be possible to guide the condenser lens to an optimum position. When the output adjustment is performed using the conventional output terminal, time rug often occurs since the operation processing is performed in the signal processing circuit 6. Therefore, it is preferable to provide a separate output adjustment terminal that is independent from signal processing circuit 6, as in the present embodiment.

Second Embodiment

Next, a distance measuring sensor in a second embodiment will be described. To parts that are identical to that of the first embodiment will be given identical reference characters in the figures, and description thereof will not be repeated.

Figure 8:
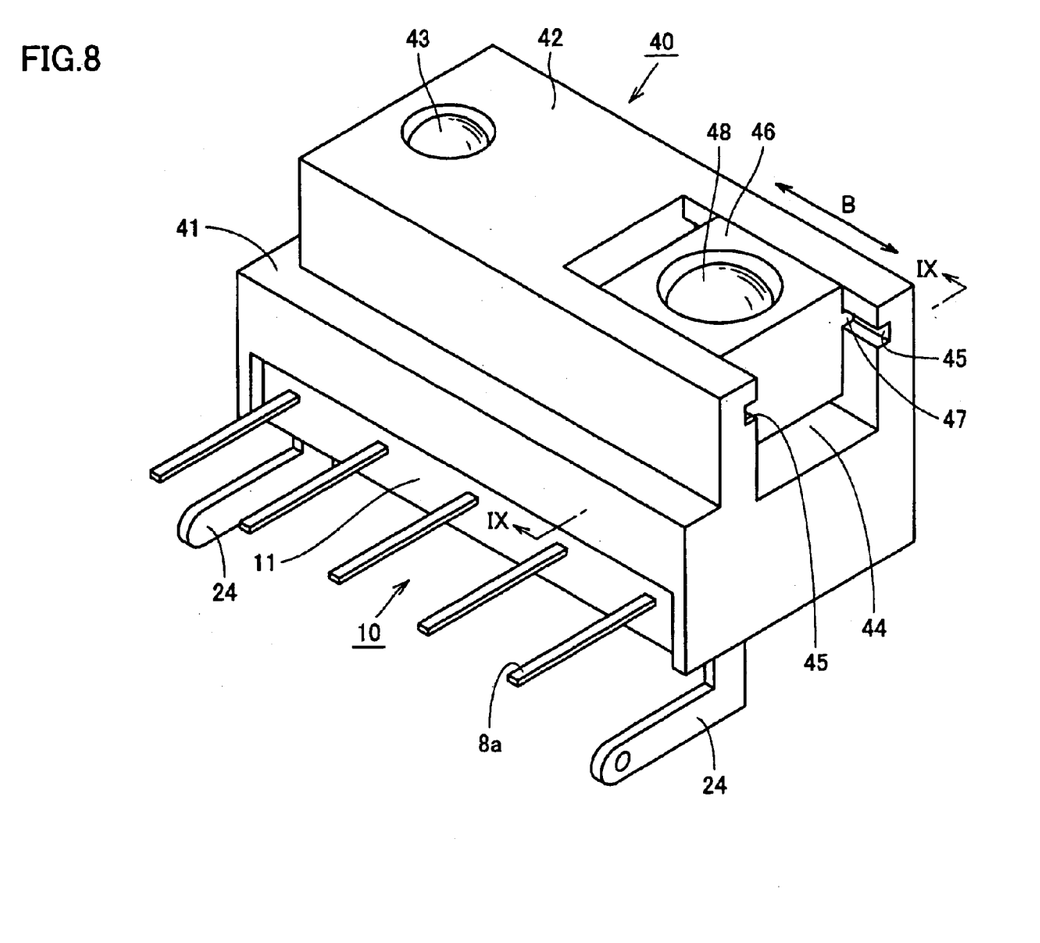
FIG. 8 is a perspective view of a structure of a distance measuring sensor according to a second embodiment of the present invention.
Figure 9:
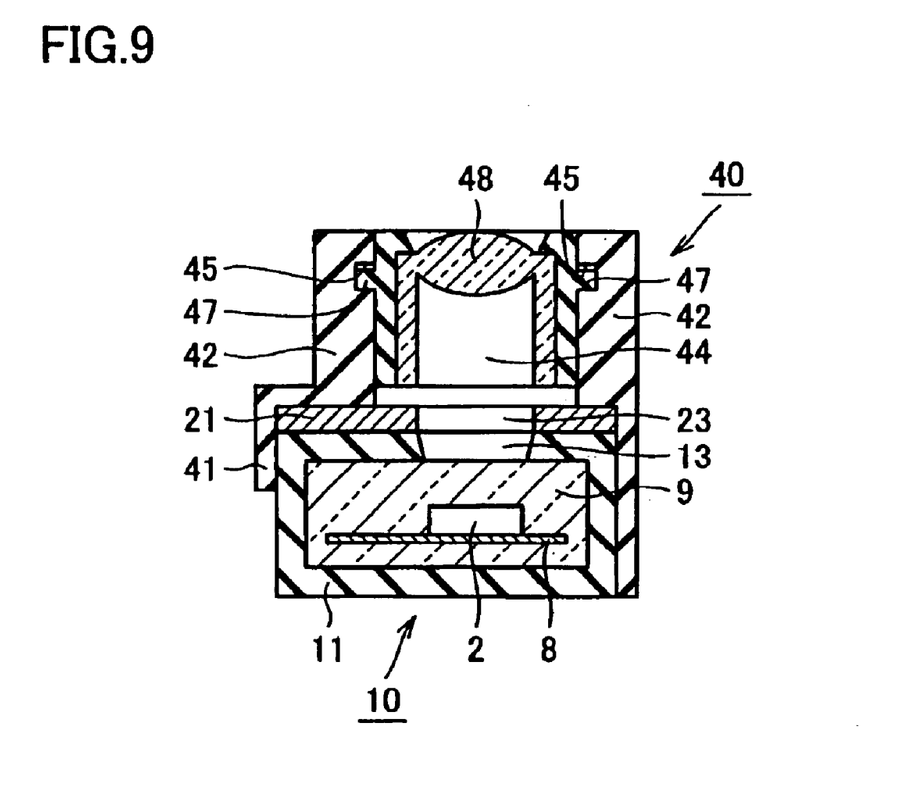
FIG. 9 is a cross-sectional view of the structure of the distance measuring sensor according to the second embodiment of the present invention, along a line IX—IX in FIG. 8.

In a distance measuring sensor according to the present embodiment, case subassembly 10 similar to that of the first embodiment is used. The lens case subassembly, however, has a structure different from that of the first embodiment. As shown in FIGS. 8 and 9, on the top face of cap forming portion 41 of lens case subassembly 40, a raised portion 42 equipped with a projection lens 43 is formed. This raised portion 42 includes a concave portion 44, at its prescribed position, to which a movable member 46 equipped with a condenser lens 48 is mounted. At a side wall of concave portion 44, a guiding channel 45 of an engagement channel extending in the same direction as the moving direction of condenser lens 48 (the direction indicated by an arrow B in the figure) is formed, and an engaging rib 47 engages with guiding channel 45. By the configuration above, the distance measuring sensor to which condenser lens 48 is movably attached can be implemented.

Figure 10:
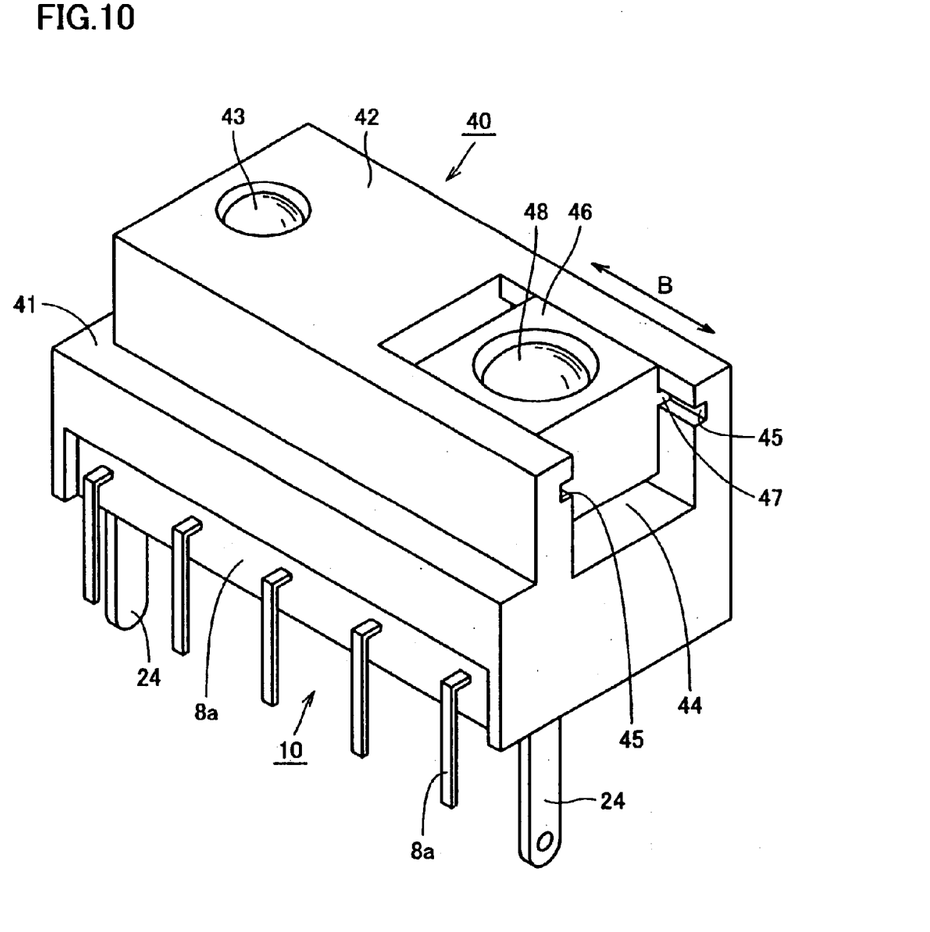
FIG. 10 is a perspective view showing another application of the distance measuring sensor according to the second embodiment of the present invention.

The distance measuring sensor shown in FIG. 8 is a so-called side view type distance measuring sensor in which a light is projected in the horizontal direction relative to a substrate of an electronic device to which the distance measuring sensor is attached, it can easily be modified to a so-called top view type distance measuring sensor, as shown in FIG. 10, in which a light is projected in the normal direction of a substrate of an electronic device to which the distance measuring sensor is attached, by modifying protruding direction of terminal 8a extending from lead frame 8 and that of shield terminal 24 extending from the shield.

In the embodiment above, the example has been described in which the distance measuring sensor is configured by separate case subassembly and lens case subassembly, but the present invention is not limited to this configuration. Other configuration may optionally employed, as long as it remains as a distance measuring sensor having the configuration in which the condenser lens is movably attached to the support member, and adjustment of an output can be achieved by aligning the condenser lens.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A distance measuring sensor, comprising:

a light emitting element;

a projection lens projecting to an object a light output from said light emitting element;

a condenser lens condensing said light reflected from said object; and a light receiving element arranged at a position to which said light is condensed by said condenser lens, and receiving said light at a light receiving face to transmit an output signal that varies in accordance with a position of said object; wherein said condenser lens is attached to a support member having a guide mechanism that enables said condenser lens to move in a prescribed direction, and said condenser lens is immovably fixed to said guide mechanism.

2. The distance measuring sensor according to claim 1, wherein a moving direction of said condenser lens includes at least a direction parallel to a straight line connecting said light emitting element and said light receiving element.

3. The distance measuring sensor according to claim 1, wherein said condenser lens is aligned and fixed to said support member so as to obtain a correct output signal corresponding to a position of the object.

4. The distance measuring sensor according to claim 1, wherein said condenser lens is fixed to said support member by a light curing adhesive or an instant adhesive.

5. The distance measuring sensor according to claim 1, wherein an engaging channel extending in said moving direction is provided to one of said condenser lens and said support member, and an engaging rib engaging with said engaging channel is provided to other one of said condenser lens and said support member.

6. The distance measuring sensor according to claim 1, further comprising an output adjusting terminal outputting an output signal from said light receiving element to outside when said condenser lens is at any one position in said moving direction.

7. The distance measuring sensor according to claim 1, further comprising:

a first subassembly structured by said light emitting element and said light receiving element mounted on a same substrate attached to a case; and a second subassembly attached to a front side of said first subassembly and having said projection lens, said condenser lens and said support member.

8. The distance measuring sensor according to claim 1, wherein a shield plate consisting of a conductive material is interposed between said first subassembly and said second subassembly; and said distance measuring sensor is attached to an electronic device at any angle by changing a protruding direction of a shield terminal of said shield plate relative to said case.

9. A method for manufacturing a distance measuring sensor, said distance measuring sensor including a light emitting element; a projection lens projecting to an object a light output from said light emitting element; a condenser lens movably attached to a support member and condensing said light reflected from the object; and a light receiving element arranged at a position to which said light is condensed by said condenser lens, and receiving said light at a light receiving face to transmit an output signal that varies in accordance with a position of said object; comprising a step of aligning and fixing said condenser lens so as to obtain a correct output signal corresponding to a position of said object.

10. A method for manufacturing a distance measuring sensor according to claim 9, wherein said aligning of said condenser lens is performed while monitoring an output signal for adjustment provided from said light receiving element.

11. A method for manufacturing a distance measuring sensor according to claim 9, wherein said fixing of said condenser lens to said support member is performed by a light curing adhesive or an instant adhesive.

* * * * *